(12) United States Patent
Somaraju

(10) Patent No.: US 11,228,455 B2
(45) Date of Patent: Jan. 18, 2022

(54) NETWORK DEVICE AND METHOD FOR FORWARDING MULTI-CAST MESSAGES IN A NETWORK

(71) Applicant: TRIDONIC GMBH & CO KG, Dornbirn (AT)

(72) Inventor: Abhinav Somaraju, Dornbirn (AT)

(73) Assignee: Tridonic GmbH & Co KG, Dornbirn (AT)

( * ) Notice: Subject to any disclaimer, the term of this patent is extended or adjusted under 35 U.S.C. 154(b) by 71 days.

(21) Appl. No.: 16/093,986

(22) PCT Filed: May 3, 2017

(86) PCT No.: PCT/EP2017/060446
§ 371 (c)(1),
(2) Date: Oct. 16, 2018

(87) PCT Pub. No.: WO2017/194356
PCT Pub. Date: Nov. 16, 2017

(65) Prior Publication Data
US 2019/0116054 A1 Apr. 18, 2019

(30) Foreign Application Priority Data
May 12, 2016 (GB) .................... 1608920

(51) Int. Cl.
*H04L 12/18* (2006.01)
*H05B 47/175* (2020.01)
(Continued)

(52) U.S. Cl.
CPC .......... *H04L 12/189* (2013.01); *H04L 12/185* (2013.01); *H04L 61/6059* (2013.01);
(Continued)

(58) Field of Classification Search
CPC . H04L 12/189; H04L 12/185; H04L 61/6059; H04L 45/16; H04L 12/1886; H05B 47/175; H05B 47/19; H04W 84/18
See application file for complete search history.

(56) References Cited

U.S. PATENT DOCUMENTS 7,606,175 B1* 10/2009 Maufer ................. H04W 8/005
370/255
7,889,051 B1 2/2011 Billig et al.
(Continued)

FOREIGN PATENT DOCUMENTS

| WO | 2012085738 | 6/2012 |
| WO | 2014108786 | 7/2014 |
| WO | 2016044123 | 3/2016 |

OTHER PUBLICATIONS

Version 2 of the Multicast Listener Discovery Protocol (MLDv2), The Internet Society, Jun. 2004 (Year: 2004).*
(Continued)

*Primary Examiner* — Thinh D Tran
(74) *Attorney, Agent, or Firm* — Andrus Intellectual Property Law, LLP

(57) ABSTRACT

The invention regards the forwarding of multicast messages in a network system. A network router according to the present invention comprises a memory in which configuration data is stored. The configuration data define at least one route along which a multicast message is to be forwarded. If the forwarding of a multicast message is allowed in principle by such specified route, it is additionally checked if from the downlink side of the network router, multicast listener information was received. Only if both conditions are fulfilled, the multicast message will be forwarded along the specified route.

10 Claims, 3 Drawing Sheets

(51) Int. Cl.
  *H04L 29/12* (2006.01)
  *H04L 12/761* (2013.01)
  *H04W 84/18* (2009.01)

(52) U.S. Cl.
  CPC ........ *H05B 47/175* (2020.01); *H04L 12/1886* (2013.01); *H04L 45/16* (2013.01); *H04W 84/18* (2013.01)

(56) References Cited

U.S. PATENT DOCUMENTS

| | | | | |
|---|---|---|---|---|
| 2003/0110288 | A1* | 6/2003 | Ramanujan | H04L 63/0272 709/238 |
| 2005/0018618 | A1* | 1/2005 | Mualem | H04L 63/1458 370/252 |
| 2005/0144467 | A1* | 6/2005 | Yamazaki | H04L 63/104 713/189 |
| 2006/0146730 | A1* | 7/2006 | Zeng | H04W 4/06 370/254 |
| 2010/0043067 | A1* | 2/2010 | Varadhan | H04L 12/18 726/13 |
| 2010/0202452 | A1 | 8/2010 | Ram et al. | |
| 2011/0134239 | A1* | 6/2011 | Vadai | F21V 29/773 348/143 |
| 2012/0014309 | A1* | 1/2012 | Iizuka | H04L 45/54 370/312 |
| 2012/0075988 | A1* | 3/2012 | Lu | H04L 45/66 370/218 |
| 2014/0095924 | A1* | 4/2014 | Holden | H04L 12/1895 714/4.11 |

OTHER PUBLICATIONS

Great Britain search report dated Nov. 15, 2016 in priority application GB1608920.3.
International Search Report and Written Opinion dated Jul. 7, 2017 in parent application PCT/EP2017/060446.
Version 2 of the Multicast Listener Discovery Protocol (MLDv2), The Internet Society, Jun. 2004.

* cited by examiner

NETWORK DEVICE AND METHOD FOR FORWARDING MULTI-CAST MESSAGES IN A NETWORK

CROSS REFERENCE TO RELATED APPLICATIONS

The present application is the U.S. national stage application of International Application PCT/EP2017/060446 filed May 3, 2017, which international application was published on Nov. 16, 2017 as International Publication WO 2017/194356 A1. The International Application claims priority to Great Britain Patent Application 1608920.3 filed May 12, 2016.

FIELD OF THE INVENTION

The invention relates to a network device for forwarding multi-cast messages and a method for forwarding such multi-cast messages in a network system.

BACKGROUND OF THE INVENTION

Modern building technology systems comprise devices that are arranged in a network. The network in many cases is configured as a mesh network in which a plurality of routers are interconnected and forward messages from a message source like a server connected to at least one of the routers to a receiving device. In many cases, messages are sent from a single source to a plurality of receivers, but not to all of possible receivers. In order to avoid that the entire network is flooded, because every of the routers forwards all the messages to any possible recipient, it is desired that such so-called multi-cast messages are forwarded selectively.

In known networks, this is achieved either by multi-cast listener discovery (MLD) or by commissioner configuration of the network routers (firewalling). When the network is established by components of a building technology system, one problem is that the security of the individual component is limited. In for example wireless lighting mesh luminairies or other small devices function as routers. Thus, if one of the routers is hacked, this could result in the network system being flooded by the router forwarding all incoming messages to any of the connected network devices, including the routers. This problem of course can be solved by individually configuring each of the routers in a commissioning process. But this on the other side reduces the flexibility of the network, because such wireless devices may encounter changing quality of the wireless link over time, even within seconds. Furthermore, a wireless recipient may be physically moved to a different location and thus may require the connection to a different router at some point in time. If commissioning is performed by a commissioner who sets up the rules for forwarding multi-cast messages for each router individually, a lot of administrative work needs to be done to keep the network always up to date and ensure its functionality for all participants.

Thus, it is desirable to ensure a sufficient flexibility of the network without the risk of a single hacked device leading to a breakdown of the entire network due to an overload of forwarded messages.

SUMMARY OF THE INVENTION

This problem is solved with the network router according to the invention and the corresponding method for forwarding multi-cast messages in a network.

The network router according to the present invention, which is in particular an IPv6 router, is capable of forwarding a multi-cast message to at least one network device. The network router comprises a storage means for storing configuration data. The configuration data identifies at least one specified route along which a multi-cast message may be forwarded by the router. The network router is further configured to forward a multi-cast message only in case that the configuration allows such forwarding of the received message and furthermore if, from the downlink side along such specified route, a respective multi-cast listener information is received. Thus, each of the routers that are interconnected in the network holds configuration data defining possible routes along which multi-cast messages may be forwarded. But not each one of these routers will forward any such multi-cast message, but only messages for which from an intended recipient multi-cast listener information is received. Thus, by combining configuration of the router by a commissioner and aspects of a multi-cast listener discovery system flooding the network with messages is avoided even in case that the single device is hacked. If such hacking of a router in fact occurs, it is only possible to subscribe to a multi-cast address but no general forwarding of incoming messages by a router can occur.

For deciding which of the multi-cast messages that are received by a router is to be forwarded, the configuration data is read in from a storage means of the router. In this configuration data at least one route along which an incoming multi-cast message is allowed to be forwarded, is defined. Then, by the network router it is checked if from the connections via which the multicast message is allowed to be forwarded, multi-cast listener information is received. If such multi-cast listener information is received in an uplink direction corresponding to an allowed downlink route, the message will be forwarded. Otherwise, the message will be discarded.

The message and network router thus have the advantage that the configuration effort that has to be performed by a commissioner is reduced, but nevertheless not any change in the system needs to be stored as soon as it occurs. The commissioner may store in the configuration data a plurality of possible downlink routes, but even then during regular operation of the network router, multi-cast messages are only forwarded along one particular downlink route being known to the network router if a multicast listener information along that route in uplink direction is received. Thus, the overall load of the network is significantly reduced compared to known systems, while at the same time the security of the system is enhanced. This is in particular important since in constrained mesh networks, luminaires or other small devices are routers. But these luminaires or other small devices usually are no trusted devices and they may thus be hacked easily.

Further aspects of the invention are defined in the sub-claims.

It is in particular advantageous to store received multi-cast listener information in the storage means of the network router. Thus, it is not necessary to receive multi-cast listener information any time at which a multi-cast message is received. Only in case that the location or the point of connection of the listening device changes an update is necessary. This could be achieved if the intended recipient will send multi-cast listener information any time it accesses another point or device in the network. On the other side, if the host device is disconnected and thus a particular connection is interrupted, the entry in the storage means may be removed.

Furthermore, the multi-cast listener information from the at least one network device can be a multi-cast subscription message and identify a destination address to which the multi-cast messages have to be forwarded.

The network router advantageously comprises an interface that is a user interface. This user interface is configured to receive user input only and in particular via the interface an authorization can be achieved and configuration data can be transmitted. Thus, by providing such dedicated user interface, it is possible to avoid that from any other of the interfaces with which the network router is connected to other network devices, the configuration of the network router can be changed.

This is in particular advantageous if an authorization is required to store the configuration data into the storage means of the network router. Thus, the router stores that configuration data only in case that authorization data satisfy authorization requirements. The authorization requirements may be stored in a non-volatile and non-rewritable memory section of the network router. Thus, it is ensured that only if authorized personnel tries to change to the configuration data such changes are in fact stored in the network router and applied afterwards. By providing the dedicated user interface, it is furthermore possible to avoid that any device except for dedicated commissioning tools can communicate with the network router at all.

The network router may be a border router and/or an IoT (Internet of Things) router and/or the network device may be another router, an IoT router and/or an IoT network device.

It is advantageous if the network router executes a firewall application. The network router therefore comprises a processor connected to the storage means and the configuration data at least partially configures the firewall application. By providing such firewall application, it is possible to use commonly known technique of configuring network devices by means of a firewall application.

The network router furthermore is configured to dynamically update the multi-cast listener information stored in its storage means, in particular when new multi-cast listener information is received by at least one network device. Thus, the storage means will always be updated as soon as a new connection of a network device is established in case that it is intended for this particular network device to receive a multi-cast message. In that case, the network device subscribes to a multi-cast message and by automatically updating the stored multi-cast listener information, the network will adapt dynamically to its currently layout. This can even be done if this network router is currently not allowed to forward multicast messages. But after adapting the configuration data it can automatically start forwarding the multi-cast messages.

On the other side, it could be advantageous if the network router discards multi-cast messages, routes and/or multi-cast listener information for devices that are not identified in the configuration data. Thus, if by configuring the network router via the user interface, the configuration data is newly written into the storage means. Only corresponding routes that are stored are maintained and multi-cast listener information that is stored in the storage means is updated correspondingly. Thus, if multi-cast listener information does not correspond to a stored route, it will be deleted from the storage means.

The invention also relates to a lighting system comprising at least one luminaire and at least one network router according to the invention.

The network router may be an integrated part of the luminaire.

BRIEF DESCRIPTION OF THE DRAWINGS

Other aspects and advantages will become apparent from the following description. The following description is based on embodiments that are illustrated in the annexed drawings. In the drawings.

DETAILED DESCRIPTION

Figure 1:
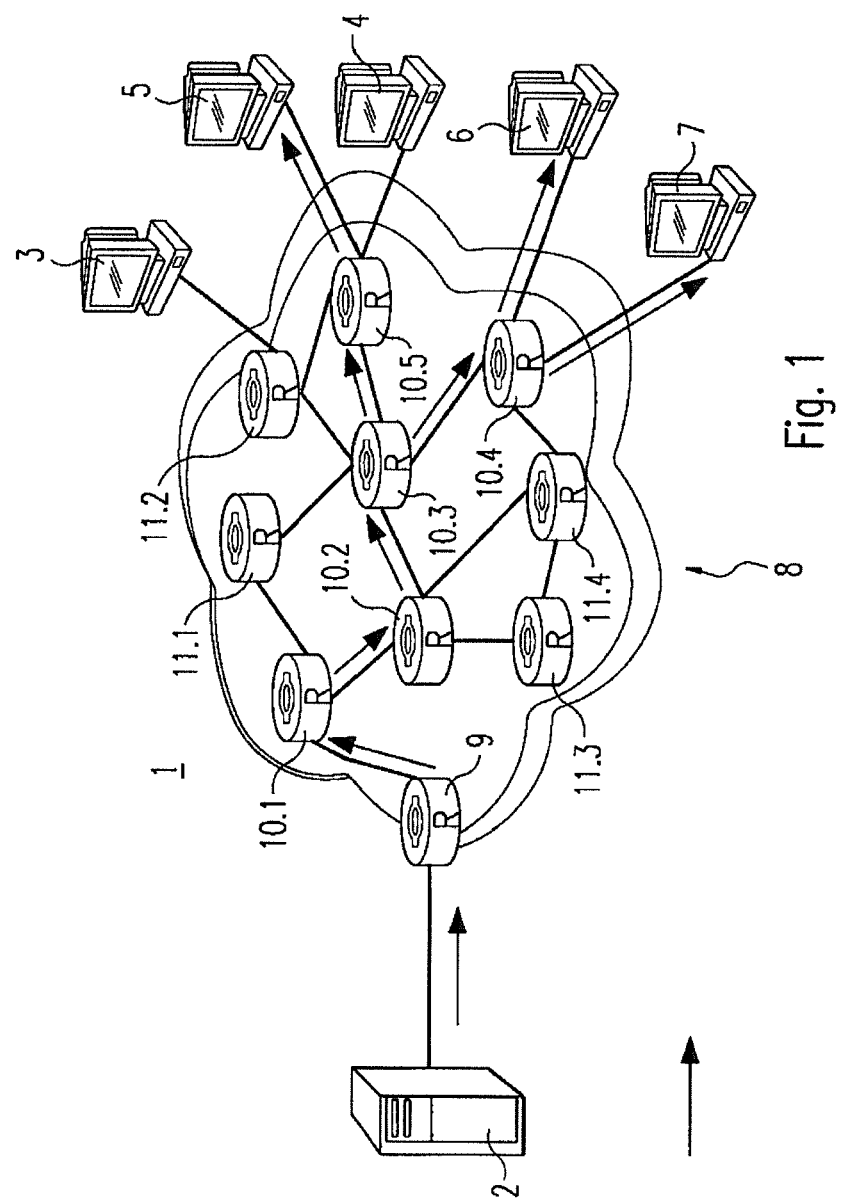
FIG. 1 shows a general layout of a network being the basis for the invention.

FIG. 1 shows an example for a network which in particular can be a wireless lighting mash as an example for a lighting system. The devices and components are illustrated as in common computer networks to make it easier to understand their functionality. The system 1 comprises a server 2 which is the source of messages in particular of the multicast messages that are to be distributed to a plurality of hosts. In the illustrated embodiments they are five hosts in total, namely 3, 4, 5, 6 and 7. But only to hosts 5, 6 and 7 the exemplary multicast message has to be distributed. The other hosts 3 and 4 are connected to the same network 8 and may communicate also with the server 2 or any other device of the network, but do not subscribe to the same multi-cast messages on a particular address contrary to the hosts 5, 6 and 7, for example.

Network 8 is a mesh network comprising a plurality of routers. At first, a border router 9 is connected to server 2. Furthermore, routers 10.1 to 10.5 and 11.1 to 11.4 are connected to at least one further router including the border router 9. In the illustrated embodiment, host 5 is connected to router 10.5 and hosts 6 and 7 are connected to router 10.4.

Thus, if a multi-cast message is to be forwarded from the server 2 to host 5, 6 and 7, it is necessary that the multi-cast message is forwarded via the routers 10.4 and 10.5. One possible route for forwarding such multi-cast message is indicated by the black arrows in the figure. Thus, after receiving the multi-cast message by border router 9, border router 9 needs to forward the multi-cast message to router 10.1, since this is the only connection of the border router 9 in the network 8. A route is defined so that the multi-cast message is forwarded from router 10.1 via router 10.2 and router 10.3 to routers 10.4 and 10.5. The message is then received by host 5 from router 10.5 and by hosts 6 and 7 from router 10.4. The described route is the downlink direction of a multi-cast message.

The routers 10.1 to 10.5 and 11.1 to 11.4 may form a part of a lighting system comprising at least one luminaire. The network routers 10.1 to 10.5 and 11.1 to 11.4 may be integrated parts of luminaires which may form a part of a lighting system.

In such a system 1, it is necessary that the routers 9, 10.$i$ along that downlink direction for forwarding multi-cast messages know to which connected network device including hosts 3 to 7 and all other routers of the network 8, a message is allowed be forwarded. This is achieved by configuring these routers respectively. Thus, in a storage means of each router 9, 10.$i$, there is stored configuration data. This configuration data is written into the memory of the routers 9, 10.$i$ by a commissioner who defines the downlink routes for the multicast messages to be forwarded. Thus, in the present case in the configuration data of router 10.3 it is stored that a multicast message received from router 10.2 may be forwarded along the arrows connecting router 10.3 with router 10.4 and connecting 10.3 with router 10.5. For the other routers along the allowed route corresponding configuration data is stored.

If a host like host 5, 6 or 7 subscribes to a multi-cast message, it will send multi-cast listener information to the router to which the respective host is directly connected on its uplink side. Thus, staying with host 5 as an example, host 5 will send multi-cast listener information to router 10.5. Since router 10.5 in its configuration data also has stored the knowledge about a possible downlink route, it will forward the information on the destination of this multi-cast message to router 10.3. Router 10.3 on the other side forwards the information to router 10.2 and so on. Thus, in the end all the routers along the downlink route for the multi-cast message of the present example will have knowledge that a possible route is starting from border router 9 along the arrows to router 10.5, or at least to which next downlink side device the message shall be forwarded.

According to the invention, it is checked in each of the routers any time a multi-cast message is received if for this multi-cast message a dedicated downlink route is stored in the configuration data. If yes, it is furthermore checked if the current multi-cast message is requested to be received by one of the hosts meaning if the hosts sent multicast listener information. To come back to the aforementioned example, if host 5 has subscribed to this multi-cast message and thus sent multi-cast listener information in the uplink direction, all the routers along the dedicated downlink route have received the multi-cast listener information. Thus, two conditions are fulfilled. First, in the configuration data a downlink route is stored so that in general the respective router is allowed to forward such multicast message along that route. Furthermore, the router also has knowledge that along this route in fact the multi-cast message has to be transferred due to the received multi-cast listener information. All the routers 10.1, 10.2, 10.3 and 10.5 will thus conclude that forwarding the multicast message along these specified routes is allowed. If any of the routers 10.i did not receive multicast listener information from host 5, the respective router will discard the received multi-cast message and thus, it is avoided that data traffic is present in network 8 which is unnecessary.

The aforementioned explanation is also true for hosts 6 and 7, but then of course relate to router 10.4 instead of router 10.5.

It is to be noted that in the routers 9, 10.i, namely in the configuration data stored in the routers 9, 10.i, it is also possible to define a plurality of possible alternative downlink routes. By defining a plurality of possible downlink routes, it is ensured that even one of the routers 10.i does not work properly or is removed from the network system 1, still distribution of multicast messages to the intended recipient is possible. Nevertheless, the downlink routes will forward the message only in case that the multi-cast listener information is received.

Figure 2:
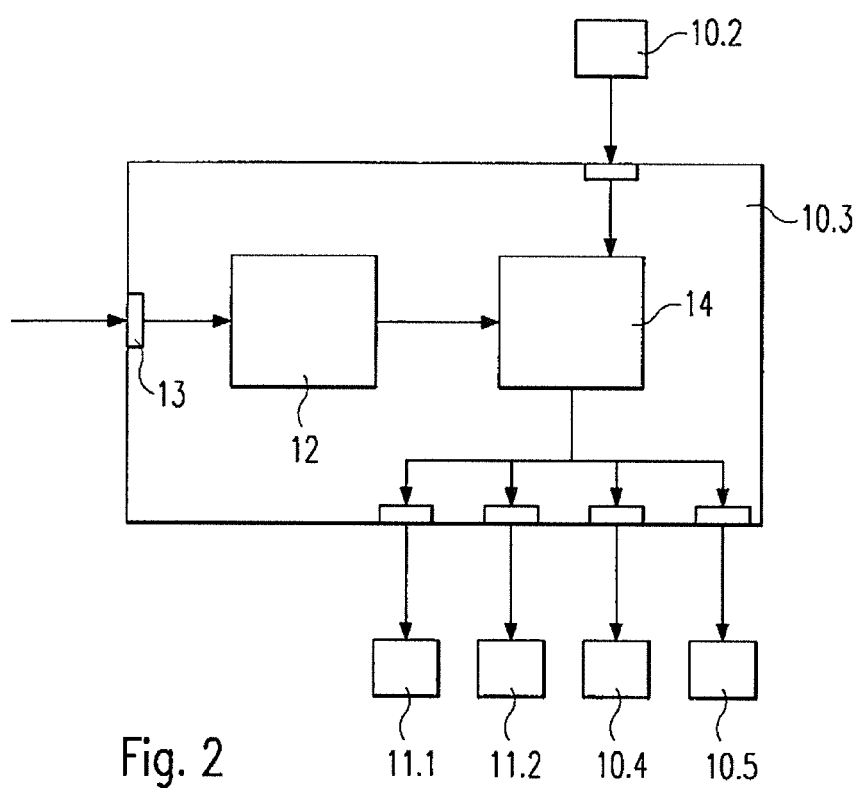
FIG. 2 shows a block diagram of an inventive network router.

In order to furthermore to understand the invention a block diagram of router 10.3 as an example is given in FIG. 2. In FIG. 2 there it is shown that the router 10.3 is connected to router 10.2 on the one (uplink) side and to routers 11.1, 11.2 as well as routers 10.4 and 10.5 on the other side (downlink side). Of course, the interfaces by which the router 10.3 is connected to all the other routers in fact are not different from each other and are illustrated only for an easier explanation of the invention so to distinguish between an uplink side which is in the present example the side of routers 10.4 and 10.5. Routers 11.1 and 11.2 are also illustrated on the downlink side, but will not receive a multicast message intended for host 5, 6 or 7 because here neither of the two conditions necessary for forwarding a multi-cast message in that direction is fulfilled.

Router 10.3 furthermore comprises a storage means 12 which may consist of a non-volatile memory and may further comprise a rewritable and a non-rewritable section. In the rewritable section of the non-volatile memory 12 the configuration data is stored. The configuration data is received via an user interface 13 as indicated in the drawing.

Here, the configuration data is written into memory 12 by a commissioner who has the authorization to write into memory 12. In the memory 12 there may also be stored an authorization condition so that only if the authorization can be achieved by a device that is connected to interface 13 writing into memory 12 is allowed. Thus, the routes that are defined in the configuration data may only be changed or altered in the memory 12 if an authorized user connects to interface 13.

The authorization check is performed in a processor 14 connected to memory 12. Furthermore, the processor 14 also performs the check if the two conditions for forwarding a multi-cast message received via the interface connected to router 10.2 is fulfilled. As explained above, these two conditions are firstly the existence of a route for forwarding a multi-cast message from router 10.2 to any of the routers 11.1, 11.2, 10.4 or 10.5 that are connected to router 10.3. If such route is set up in the configuration data, then it is checked if from any of connected routers 11.1, 11.2, 10.4 or 10.5 multi-cast listener information was received. In the example of FIG. 1, such multi-cast listener information was received from routers 10.4 and 10.5. Thus, as for routers 10.4 and 10.5, the multicast listener information is also stored in memory 12, the processor determines that forwarding this particular multi-cast message is allowed from router 10.2 to routers 10.4 and 10.5. As a consequence, the multicast message to which hosts 5, 6 and 7 have subscribed is forwarded to routers 10.4 and 10.5.

Thus, in the end, the message will be forwarded only along the route as indicated by the arrows in FIG. 1. The other routers that do not lie on the defined routes will not forward a message even if one of them should receive such message. But as indicated router 20.3 will not forward the multicast message to routers 11.1 or 11.2, because at least one of the conditions is not fulfilled.

Figure 3:
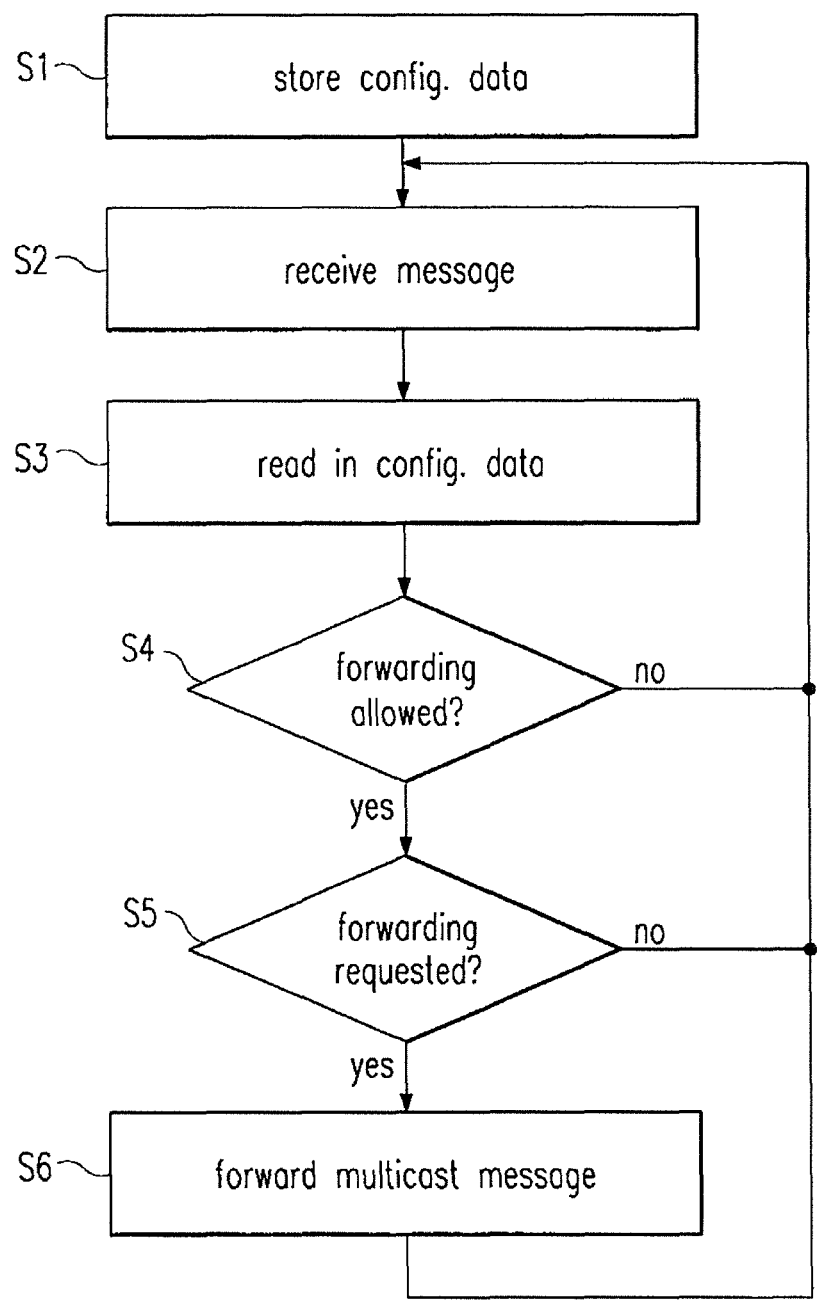
FIG. 3 shows a simplified flowchart for illustrating the method according to the invention.

In FIG. 3 there is shown a simplified flowchart for executing the inventive method. At first, configuration data is stored in memory 12 of any one of routers 9, 10.i in step S1. Then, during operation of the router, if a multicast message is received in step S2, the configuration data stored in memory 12 is read in by processor 14 in step S3. On the basis of the read-in configuration data in processor 14, it is checked whether forwarding of multicast messages is generally allowed along any of the possible routes that can be realized by the respective router by forwarding a message to any of the other connections to further routers or host devices. Thus, in step S4 it is determined if in general such forwarding along a dedicated route is allowed for the router. If yes, it is furthermore checked in step S5 if such forwarding is in fact requested. Thus, in processor 14, it is also checked if multicast listener information was received from any of the devices connected to the router on its downlink side. If yes, both conditions as illustrated in steps S4 and S5 are fulfilled and consequently the received multicast message is forwarded in step S6. Thereafter, the flow goes back to the beginning and is repeated any time such multicast message is received in step S2.

On the other side, if in steps S4 or step S5, it is determined that the respective condition is not fulfilled, no forwarding is performed and it is directly awaited if a new multicast message is received in step S2 for which the following method steps are to be executed again. The method steps as illustrated are executed in any of the routers in which at least configuration data for one route is stored.

In the future it can be expected that an IoT network will contain a lot of devices which are connected to the IoT network and the devices may have multiple roles (e.g. a luminaire acting as a router). The invention offers the advantage that it can provide a multicast configuration interface on selected IoT devices e.g. luminaires which a commissioner can use and can in parallel provide MLD like features on such IoT devices e.g. luminaires.

What is claimed is:

1. A network system using the IPv6 communications protocol and multicast listener discovery protocol, the network system comprising:
    a server that is the source of multicast messages that are to be distributed to one or more subscribing hosts;
    a plurality of hosts that may or may not subscribe to a multicast message;
    a mesh network of wireless IPv6 network routers that uses the multicast listener discovery protocol for forwarding multicast messages, wherein the wireless network IPv6 routers form a part of a building technology system comprising at least one luminaire, and each said wireless IPv6 network router comprises memory for storing multicast listener information and for storing configuration data set separately from the multicast listener discovery protocol and identifying one or more specified downlink routes to one or more other routers or hosts in the mesh network along which received multicast messages are allowed to be forwarded by the router, wherein the configuration data is stored in the memory of each wireless IPv6 network router during the commissioning process when the router is commissioned and each router is further configured to receive multicast listener information from subscribing hosts and store the received multicast listener information in its memory; and wherein each said wireless IPv6 network router is configured to forward a multicast message to the downlink side along a specified route only if the route is allowed by the configuration data and if the router has received and stored multicast listener information that forwarding the message along the downlink route has been requested, and is configured to not forward a multicast message to the downlink side along a specified route if the route is not allowed by the configuration data even if the router has received and stored multicast listener information that forwarding the message along the downlink route has been requested such that a single hack cannot flood the wireless network with messages;
    wherein each of the wireless IPv6 network routers in the mesh network comprises a dedicated user interface configured to communicate with a commissioning device to receive the configuration data, and each of the wireless IPv6 network routers in the mesh network is able to store configuration data in memory only in case that configuration data has been received from a commissioning device connected to the dedicated user interface and authorization data has been provided that satisfies authorization requirements.

2. The network system according to claim 1, wherein the multicast listener information from each of the one of more hosts is a multicast subscription message that identifies a destination address the multicast messages are to be forwarded to.

3. The network system according to claim 1, wherein the mesh network of wireless IPv6 network routers comprises at least one border router, and one or more IoT-routers.

4. The network system according to claim 1, wherein each of the IPv6 network routers executes a firewall application, and the configuration data at least partially configures the firewall application.

5. The network system according to claim 1, wherein each of the wireless IPv6 network routers in the mesh network is configured to dynamically update the multicast listener information stored in memory, when new multicast listener information is received by at least one network device.

6. The network system according to claim 5, wherein each of the wireless IPv6 network routers in the mesh network discards routes and/or multicast listener information for devices not identified in in the configuration data.

7. The network system as recited in claim 1 wherein one or more of the IPv6 network routers is integrated as part of a luminaire.

8. The network system as recited in claim 1 wherein one or more of hosts is an integrated part of the luminaire.

9. A method for forwarding a multicast message through a network system using the IPv6 communications protocol and multicast listener discovery protocol from a server to one or more hosts, the method comprising the steps of:
    a. providing a server that is the source of the multicast message that is to be distributed to one or more hosts;
    b. providing a plurality of hosts that may or may not subscribe to the multicast message;
    c. providing a mesh network of wireless IPv6 network routers that uses the multicast listener discovery protocol, wherein the wireless network IPv6 routers form a part of a building technology system comprising at least one luminaire, and further wherein each wireless IPv6 network router in the mesh network has memory in which configuration data is stored separately from the multicast listener discovery protocol and identifies one or more specified downlink routes to one or more other routers in the mesh network along which received multicast messages are allowed to be forwarded by the router, and further wherein the memory for each router stores multicast listener information for multicast messages subscribed to by hosts on downlinked routes from the router;
    d. receiving the multicast message at a router interface on an uplinked side of one of the wireless IPv6 network routers in the mesh network;
    e. reading configuration data from the memory in said wireless IPv6 network router;
    f. comparing the multicast message to the read in configuration data to determine whether the received multicast message is generally allowed along any of the possible routes that can be realized by the router by forwarding the multicast message to a downlinked network device;
    g. checking multicast listener information stored in the memory of the router to determine whether forwarding of the multicast message has been requested by one or more of the hosts on a downlinked route of the router;
    h. forwarding the multicast message if it is determined to be allowed in step f and if it is determined to have been requested in step g and not forwarding the multicast message if it is determined to not be allowed in step f even if it is determined to have been requested in step g such that a single hack cannot flood the wireless network with messages;

wherein each of the wireless IPv6 network routers in the mesh network comprises a dedicated user interface configured to communicate with a commissioning device to receive the configuration data, and each of the wireless IPv6 network routers in the mesh network is able to store configuration data in memory only in case that configuration data has been received from a commissioning device connected to the dedicated user interface and authorization data has been provided that satisfies authorization requirements.

10. The method of claim 9, further comprising the step of storing multicast listener information only for the at least one network device identified in the configuration data.

\* \* \* \* \*